Jan. 26, 1965   C. W. GERHARDT   3,166,933
APPARATUS FOR MEASURING CORROSION RATES
Original Filed June 9, 1955
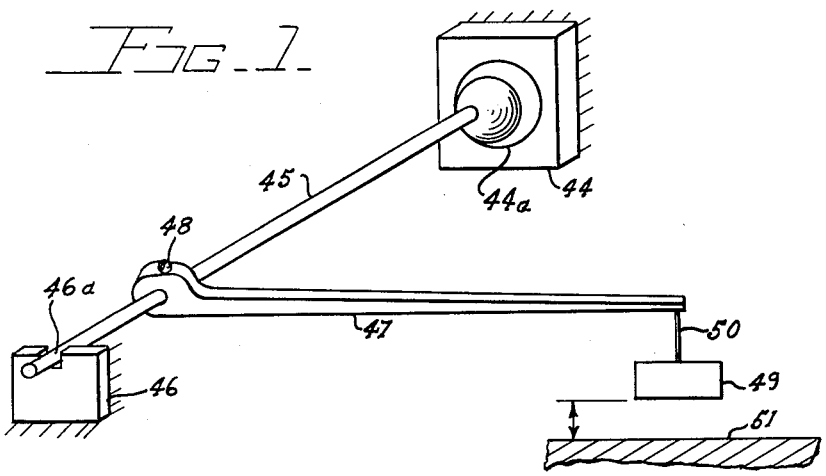
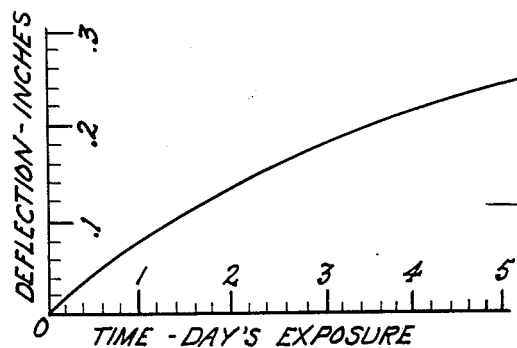
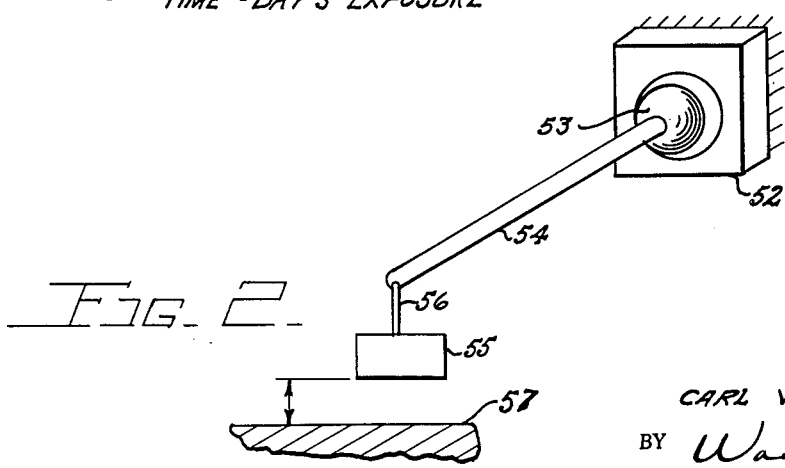
INVENTOR.
CARL W. GERHARDT
BY
ATTORNEYS 3,166,933
APPARATUS FOR MEASURING
CORROSION RATES
Carl W. Gerhardt, 2945 Dryden Road, Dayton 39, Ohio
Application Sept. 7, 1960, Ser. No. 54,553, which is a division of application Ser. No. 514,408, June 9, 1955, now Patent No. 2,972,248. Divided and this application June 25, 1963, Ser. No. 290,567
2 Claims. (Cl. 73—86)
(Granted under Title 35, U.S. Code (1952), sec. 266)

The invention described herein may be manufactured and used by or for the United States Government for governmental purposes without payment to me of any royalty thereon.

This invention is a division of my copending application Serial Number 54,553, filed September 7, 1960 which, in turn, is a division of application Serial Number 514,408, filed June 9, 1955 and matured into United States Patent Number 2,972,248. The invention relates to an apparatus for measuring the corrosivity of an atmosphere or environment or for measuring the corrodibility of a resilient member such as a spring and could also be used to measure erosive rates.

The conventional method to measure corrosivity of an environment or the corrodibility of material is to prepare a test sample or samples, put them in a corrosive environment and measure the loss in weight of the samples after a fixed period of time. Such a method requires an extremely accurate balance and it has been necessary to run a large number of samples averaging results to make any reasonably accurate estimation of corrosiveness. There seem to be a number of factors that influence the accuracy of this method including the original preparation of the samples and the handling and preparation of the samples after exposure prior to weighing.

It is an object of this invention to provide an improved apparatus for testing corrosion rates wherein a measurement is made indicative of the change of strength of a resilient member with time as an indication of corrosion rate.

It is another object of this invention to provide an improved apparatus for measuring the corrosivity of an environment or an atmosphere wherein such information is obtained from a measurement indicative of the change of strength with time of the resilient member.

It is a further object of this invention to provide an apparatus for measuring the corrosion rate of a resilient material wherein such information is obtained from a measurement indicative of the change of strength of the resilient member.

It is yet another object of this invention to provide an apparatus for testing erosion rates wherein a measurement is made indicative of the change of strength of a resilient member with time as an indication of the erosion rate.

These and other objects of the invention will become apparent as the detailed description of the invention proceeds.

The invention will be more clearly understood from the following detailed description of specific examples thereof read in conjunction with the accompanying drawings wherein:

FIGURE 1 is a perspective view of one embodiment of my invention;

FIGURE 2 is a perspective view of another embodiment of my invention; and

FIGURE 3 is a typical graphical presentation of the data obtained from an embodiment of my invention such as is shown in FIGURE 1.

Referring now to the drawings, FIGURE 1 shows one embodiment of my invention. Resilient rod 45 capable of measurable elastic twisting is rigidly positioned in frame 44 by weld 44a or other suitable means. Rod 45 is also supported by support 46 within notch 46a at a point spaced from frame 44 with the rod being free to turn within the notch. Lever 47 is positioned on rod 45 and is rigidly attached thereto by set screw 48 or by other suitable means. A weight 49 is attached near the free end of lever 47 by means of a wire 50 or other suitable means. This weight through the medium of lever 47 applies an appreciable twist or torsional force to rod 45.

This apparatus is used in the following fashion. A reading is taken of the distance of weight 49 above a fixed point 51 with the apparatus initially placed in the corrosive environment. In a similar fashion as with the other apparatus readings spaced with time are taken. These readings may be plotted in a manner similar to that shown in FIGURE 3 or the data may be used directly.

Another detailed description of an embodiment of my invention is made with relation to FIGURE 2. In this figure rod 54 is rigidly attached to support 52 by weld 53 or other suitable means. Near the end of or at a point on rod 54 spaced from support 52 a weight 55 is attached by wire 56 or other suitable means.

In using this apparatus it is first positioned in a corrosive atmosphere or environment with the weight located at a certain distance from a fixed point 57. The reading is taken of the distance between weight 55 and point 57. Then at spaced intervals of time additional readings are taken of this spacing between weight 55 and point 57. This data is used in a similar manner to that of the previous embodiment. Rod 54, of course, must be a resilient or spring-like lever which will corrode losing measurable strength with time.

Although the invention has been described in terms of specified apparatus which is set forth in considerable detail, it should be understood that this is by way of illustration only and that the invention is not necessarily limited thereto, since alternative embodiments and operating techiques will become apparent to those skilled in the art in view of the disclosure. For example, the various apparatus embodiments of the invention can be used in the determination of erosive rates as well as corrosive rates, i.e., to determine the erosiveness of an environment or atmosphere or the erodibility of a resilient member. The resilient member would be made of suitable erodible material for measuring the erosiveness of an atmosphere or environment, and in many cases this material could be the same material as would be used for corrosive rate measurements. The fact that a resilient member made of the same material can in many cases be used to measure both corrosive rates and erosive rates is fortunate since sometimes an environment or atmosphere will have both corrosive and erosive properties. Accordingly, modifications are contemplated which may be made without departing from the spirit of the described invention or of the scope of the appended claims.

What is claimed is:

1. A corrosion rate measuring apparatus comprising a frame, a corrodible resilient rod rigidly attached to said frame and extending substantially horizontally therefrom, a support for said rod spaced from said frame, said rod being free to move on said support and said rod being made of such material that it will exhibit measurable torsional movement in a resilient fashion and will tend to gradually lose its resistance to twisting with time when placed in a corrosive environment, a lever rigidly attached to said rod at a point spaced from said frame, and a weight attached to said lever spaced from the point of attachment of said lever to said rod, said weight being spaced from a fixed reference point from which distance measurements may be taken between the reference point and the weight.

2. A corrosion rate measuring apparatus comprising a frame, a corrodible resilient rod rigidly attached to said frame, said rod being made of such material that it will lose measurable resistance to bending with time when placed in a corrosive environment, and a weight attached to said rod at a point spaced from said frame, said weight being spaced from a fixed reference point, from which distance measurements may be taken between the reference point and the weight.

No references cited.

RICHARD C. QUEISSER, *Primary Examiner.*